(12) United States Patent
Matsunaga et al.

(10) Patent No.: US 10,625,418 B2
(45) Date of Patent: Apr. 21, 2020

(54) CONTROL SYSTEM, CONTROLLER, CONTROL METHOD, AND RECORDING MEDIUM

(71) Applicant: OMRON Corporation, Kyoto (JP)

(72) Inventors: Daisuke Matsunaga, Otsu (JP); Igor Jovanovic, Barcelona (ES); Diego Escudero-Rodrigo, Barcelona (ES); Ferran Carlas Ponce, Barcelona (ES); Raffaele Vito, Barcelona (ES); Sandra Pallarés Gual, Barcelona (ES)

(73) Assignee: OMRON Corporation, Kyoto (JP)

( * ) Notice: Subject to any disclaimer, the term of this patent is extended or adjusted under 35 U.S.C. 154(b) by 367 days.

(21) Appl. No.: 15/846,206

(22) Filed: Dec. 19, 2017

(65) Prior Publication Data
US 2018/0250817 A1 Sep. 6, 2018

(30) Foreign Application Priority Data

Mar. 3, 2017 (JP) .................................. 2017-040259

(51) Int. Cl.
*B25J 9/04* (2006.01)
*B25J 9/16* (2006.01)
*B25J 19/00* (2006.01)

(52) U.S. Cl.
CPC .............. *B25J 9/1666* (2013.01); *B25J 9/04* (2013.01); *B25J 9/044* (2013.01); *B25J 9/1664* (2013.01);

(Continued)

(58) Field of Classification Search
CPC ...... B25J 9/1666; B25J 9/04; A61B 2034/715; A61B 34/71; Y10S 901/499;
(Continued)

(56) References Cited

U.S. PATENT DOCUMENTS 6,335,510 B1 * 1/2002 Carbines ................ B23K 9/287
219/125.1
7,378,612 B2 * 5/2008 Takahashi ................ B23K 9/32
219/125.1

(Continued)

FOREIGN PATENT DOCUMENTS

JP H09239687 9/1997
JP H10211594 8/1998

(Continued)

OTHER PUBLICATIONS

"Search Report of European Counterpart Application" dated Jul. 13, 2018, p. 1-p. 6.

*Primary Examiner* — Dalena Tran
(74) *Attorney, Agent, or Firm* — JCIPRNET

(57) ABSTRACT

A control system, a controller, a control method and a recording medium capable of preventing damage to a cable occurring during an operation under control of a scara robot are provided. A control system includes a scara robot 300 and a controller configured to control the scara robot 300. The controller includes an acquisition unit configured to acquire a target position of a control object in the scara robot 300 and a decision unit configured to decide a rotational direction of an operation tool 332 so that a cable 333 does not collide with a component of the scara robot 300 when the control object moves to the target position.

13 Claims, 13 Drawing Sheets

(52) U.S. Cl.
CPC .......... *B25J 19/0025* (2013.01); *Y10S 901/09* (2013.01); *Y10S 901/15* (2013.01); *Y10S 901/49* (2013.01)

(58) Field of Classification Search
CPC .... Y10S 901/15; Y10S 901/09; Y10S 901/02; Y10S 901/19
USPC ................................ 700/245, 262; 901/2, 19
See application file for complete search history.

(56) References Cited

U.S. PATENT DOCUMENTS

| | | | |
|---|---|---|---|
| 9,138,902 B2 * | 9/2015 | Suzuki | ................. B25J 19/0025 |
| 10,384,292 B2 * | 8/2019 | Lizotte | ................... B23K 9/125 |

FOREIGN PATENT DOCUMENTS

| | | |
|---|---|---|
| JP | H11099493 | 4/1999 |
| JP | 2016-078160 | 5/2016 |
| JP | 2016-153151 | 8/2016 |

* cited by examiner

CONTROL SYSTEM, CONTROLLER, CONTROL METHOD, AND RECORDING MEDIUM

CROSS-REFERENCE TO RELATED APPLICATION

This application claims the priority benefit of Japanese application serial no. 2017-040259, filed on Mar. 3, 2017. The entirety of the above-mentioned patent application is hereby incorporated by reference herein and made a part of this specification.

BACKGROUND

Technical Field

The disclosure relates to control of a scara robot, and particularly, to a technology for deciding a rotational direction of a control object of a scara robot.

Description of Related Art

In the factory automation (FA) field, horizontal articulated robots called selective compliance assembly robot arm (scara) robots are widespread. Scara robot is a general term for industrial robots in which a plurality of arms connected to each other operate on a horizontal plane.

A scara robot is driven such that it rotates the plurality of arms connected to each other in cooperation and thus performs a predetermined operation on a workpiece. An operation on the workpiece is performed by an operation tool that is driven through the arms of the scara robot. As an operation example, the scara robot may be driven such that it rotates the arms so that an operation tool is moved to a position of a workpiece, and picks up a workpiece conveyed along a first line. Then, the scara robot releases the workpiece which has been picked up into a container conveyed along the first line. Therefore, workpieces sequentially conveyed are automatically put into the container.

Components of the scara robot are connected by cables. The cables may be damaged due to collision with other components or twisting during an operation. In order to prevent such damage to the cables, various technologies have been developed.

Regarding these technologies, in Japanese Patent Application Laid-Open No. 2016-153151 (Patent Document 1), a joint structure of a robot for releasing twisting of a power cable caused when a second arm rotates with respect to a first arm is disclosed.

In Japanese Patent Application Laid-Open No. 2016-78160 (Patent Document 2), a robot arm mechanism for eliminating interference between electrical cables and surrounding components or the like, damage to components that are interfered with, breakage of electrical cables and the like is disclosed.

[Patent Document 1] Japanese Patent Application Laid-Open No. 2016-153151

[Patent Document 2] Japanese Patent Application Laid-Open No. 2016-78160

In both of the technologies disclosed in Patent Documents 1 and 2, damage to cables is eliminated by adding a mechanical configuration. However, when the mechanical configuration is added, the cost of the scara robot increases, and the size of the scara robot increases. Therefore, there is a demand for a technology for preventing damage to a cable occurring during an operation under control of a scara robot.

SUMMARY

According to one or some exemplary embodiments of the invention, a control system includes a robot and a controller configured to control the robot. The robot includes a first rotational shaft; a first arm which is rotatable on a plane orthogonal to the first rotational shaft about the first rotational shaft; a second rotational shaft which is disposed parallel to the first rotational shaft and is provided in the first arm; a second arm which is rotatable on a plane orthogonal to the second rotational shaft about the second rotational shaft; a main shaft which is disposed parallel to the second rotational shaft and is provided in the second arm; an operation tool which is rotatable about the main shaft and provided at a tip of the main shaft, and performs a predetermined operation on a workpiece; and a cable connecting the second arm to the operation tool. The controller includes an acquisition unit configured to acquire a target position of a control object in the robot; and a decision unit configured to decide a rotational direction of the operation tool so that the cable does not collide with a component of the robot when the control object moves to the target position.

According to one or some exemplary embodiments of the invention, there is provided a controller of a robot. The robot includes a first rotational shaft; a first arm which is rotatable on a plane orthogonal to the first rotational shaft about the first rotational shaft; a second rotational shaft which is disposed parallel to the first rotational shaft and is provided in the first arm; a second arm which is rotatable on a plane orthogonal to the second rotational shaft about the second rotational shaft; a main shaft which is disposed parallel to the second rotational shaft and is provided in the second arm; an operation tool which is rotatable about the main shaft and provided at a tip of the main shaft, and performs a predetermined operation on a workpiece; and a cable connecting the second arm to the operation tool. The controller includes an acquisition unit configured to acquire a target position of a control object in the robot; and a decision unit configured to decide a rotational direction of the operation tool so that the cable does not collide with a component of the robot when the control object moves to the target position.

According to still another aspect, there is provided a control method of a robot. The robot includes a first rotational shaft; a first arm which is rotatable on a plane orthogonal to the first rotational shaft about the first rotational shaft; a second rotational shaft which is disposed parallel to the first rotational shaft and is provided in the first arm; a second arm which is rotatable on a plane orthogonal to the second rotational shaft about the second rotational shaft; a main shaft which is disposed parallel to the second rotational shaft and is provided in the second arm; an operation tool which is rotatable about the main shaft and provided at a tip of the main shaft, and performs a predetermined operation on a workpiece; and a cable connecting the second arm to the operation tool. The control method includes acquiring a target position of a control object in the robot; and deciding a rotational direction of the operation tool so that the cable does not collide with a component of the robot when the control object moves to the target position.

According to one or some exemplary embodiments of the invention, there is provided a not-transitory recording medium storing a control program of a robot. The robot includes a first rotational shaft; a first arm which is rotatable on a plane orthogonal to the first rotational shaft about the first rotational shaft; a second rotational shaft which is disposed parallel to the first rotational shaft and is provided in the first arm; a second arm which is rotatable on a plane orthogonal to the second rotational shaft about the second rotational shaft; a main shaft which is disposed parallel to the second rotational shaft and is provided in the second arm; an operation tool which is rotatable about the main shaft and provided at a tip of the main shaft, and performs a predetermined operation on a workpiece; and a cable connecting the second arm to the operation tool. The control program causes a controller of the robot to execute acquiring a target position of a control object in the robot; and deciding a rotational direction of the operation tool so that the cable does not collide with a component of the robot when the control object moves to the target position.

DESCRIPTION OF THE EMBODIMENTS

Figure 1:
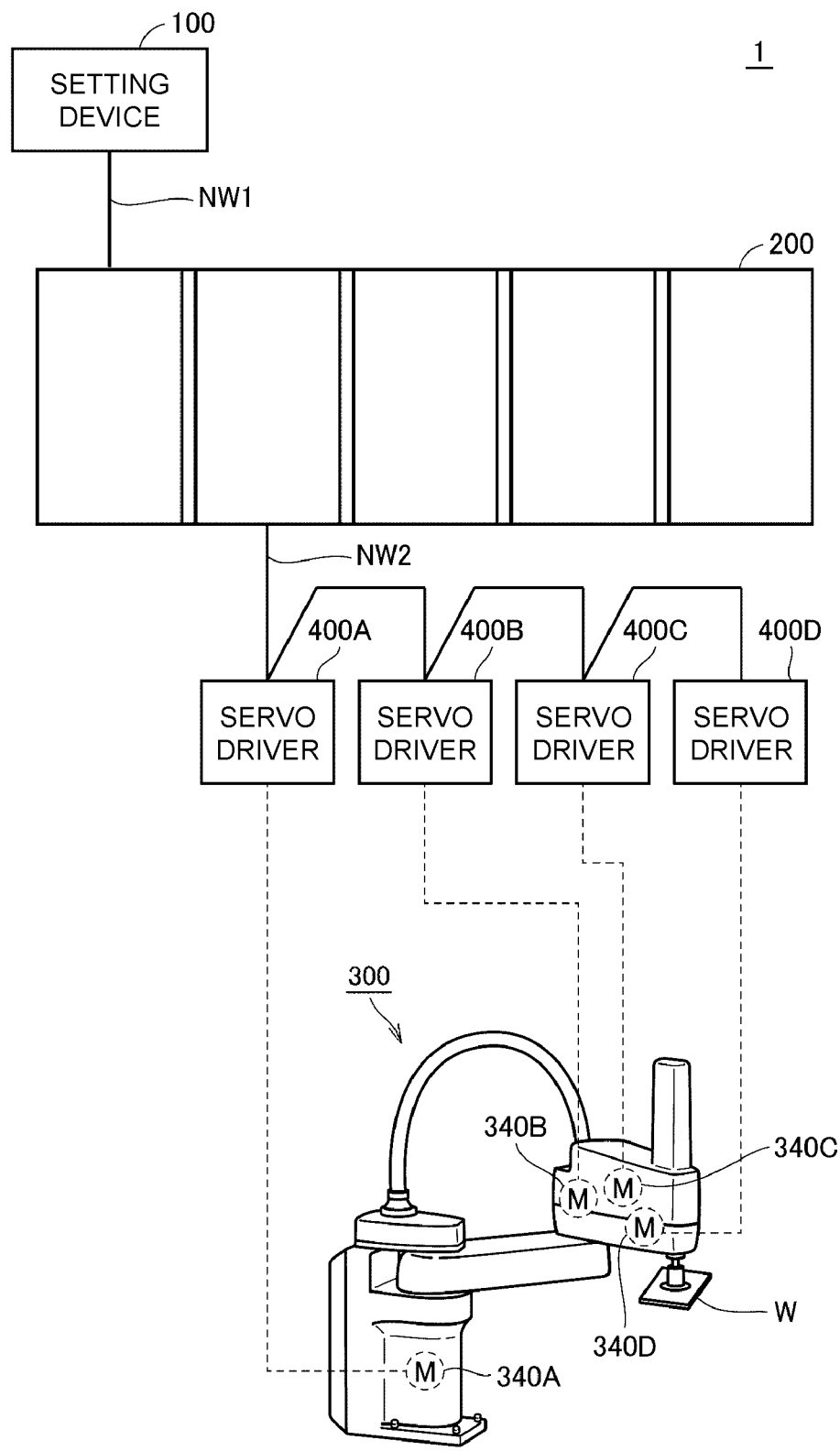
FIG. 1 is a schematic diagram showing a configuration example of a control system according to a first embodiment.

Preferably, the decision unit decides the rotational direction on the basis of relative relations between a rotation angle of the second arm before the control object moves, a rotation angle of the operation tool before the control object moves, and a rotation angle of the operation tool after the control object moves.

Preferably, the decision unit decides the rotational direction on the basis of relative relations between a rotation angle of the second arm before the control object moves, a rotation angle of the second arm after the control object moves, a rotation angle of the operation tool before the control object moves, and a rotation angle of the operation tool after the control object moves.

Preferably, the decision unit decides the rotational direction before movement of the control object starts.

Preferably, the operation tool rotates in the rotational direction when the control object moves to the target position.

In an aspect, it is possible to prevent damage to a cable occurring during an operation under control of a scara robot.

The above and other objects, features, aspects, and advantages of the present disclosure can be clearly understood from the following detailed description of the present invention which will be understood in connection with the appended drawings.

Embodiments of the present invention will be described below with reference to the drawings. In the following description, the same elements and components will be denoted with the same reference numerals. Names and functions thereof are the same. Therefore, details thereof will not be repeated. Here, embodiments and modified examples to be described below may be selectively combined appropriately.

First Embodiment

[A. System Configuration]

First, a configuration example of a control system 1 according to the present embodiment will be described. FIG. 1 is a schematic diagram showing a configuration example of the control system 1 according to the present embodiment.

Referring to FIG. 1, the control system 1 includes a setting device 100, a controller 200 such as a programmable logic controller (PLC), a plurality of drive devices, and a scara robot 300. In the example in FIG. 1, as an example of the drive devices, servo drivers 400A to 400D configured to drive servomotors 340A to 340D are exemplified. Hereinafter, the servomotors 340A to 340D will be collectively referred to as a servomotor 340. The servo drivers 400A to 400D will be collectively referred to as a servo driver 400. The drive device is not limited to the servo driver 400, and a corresponding drive device may be used according to a motor that is a driven device. For example, when an induction motor or a synchronous motor is driven, an inverter driver and the like may be used as the drive device.

The setting device 100 is, for example, a terminal device such as a personal computer (PC), a tablet terminal, or a smartphone. The setting device 100 and the controller 200 are connected to a field network NW1. For the field network NW1, for example, EtherNET (registered trademark) is used. However, the field network NW1 is not limited to EtherNET, and any communication network may be used. For example, the setting device 100 and the controller 200 may be directly connected using a signal line.

The controller 200 and the servo driver 400 are connected to a field network NW2 through a daisy chain. For the field network NW2, for example, EtherCAT (registered trademark) is used. However, the field network NW2 is not limited to EtherCAT, and any communication network may be used. As an example, the controller 200 and the servo driver 400 may be directly connected using a signal line. In addition, the controller 200 and the servo driver 400 may be integrally configured.

The servo driver 400 drives the servomotor 340 of the scara robot 300. An encoder (not shown) is disposed on a rotational shaft of the servomotor 340. The encoder outputs a position (rotation angle), a rotation speed, and a cumulative rotation number of a servomotor as feedback values of the servomotor 340 to the servo driver 400. However, the feedback values from the servomotor 340 may be directly input to the controller 200.

Here, while a case in which the control system 1 includes one controller 200 has been exemplified in FIG. 1, the control system 1 may include a plurality of controllers 200. In addition, while a case in which the control system 1 includes one scara robot 300 has been exemplified in FIG. 1, the control system 1 may include a plurality of scara robots 300. In addition, while a case in which the controller 200 and the servo driver 400 are directly connected has been exemplified in FIG. 1, a robot controller may be provided between the controller 200 and the servo driver 400.

[B. Device Configuration of Scara Robot]

Figure 2:
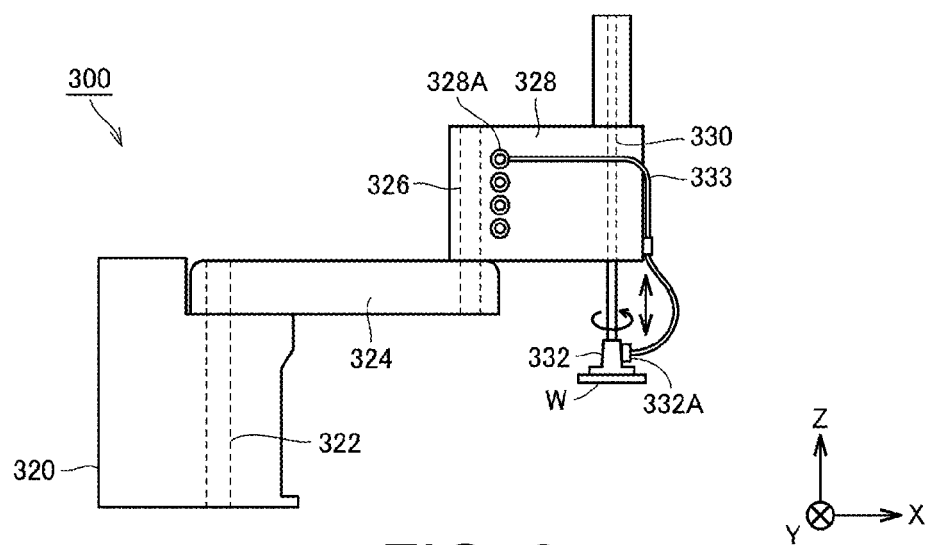
FIG. 2 is a side view of a scara robot according to the first embodiment.
Figure 3:
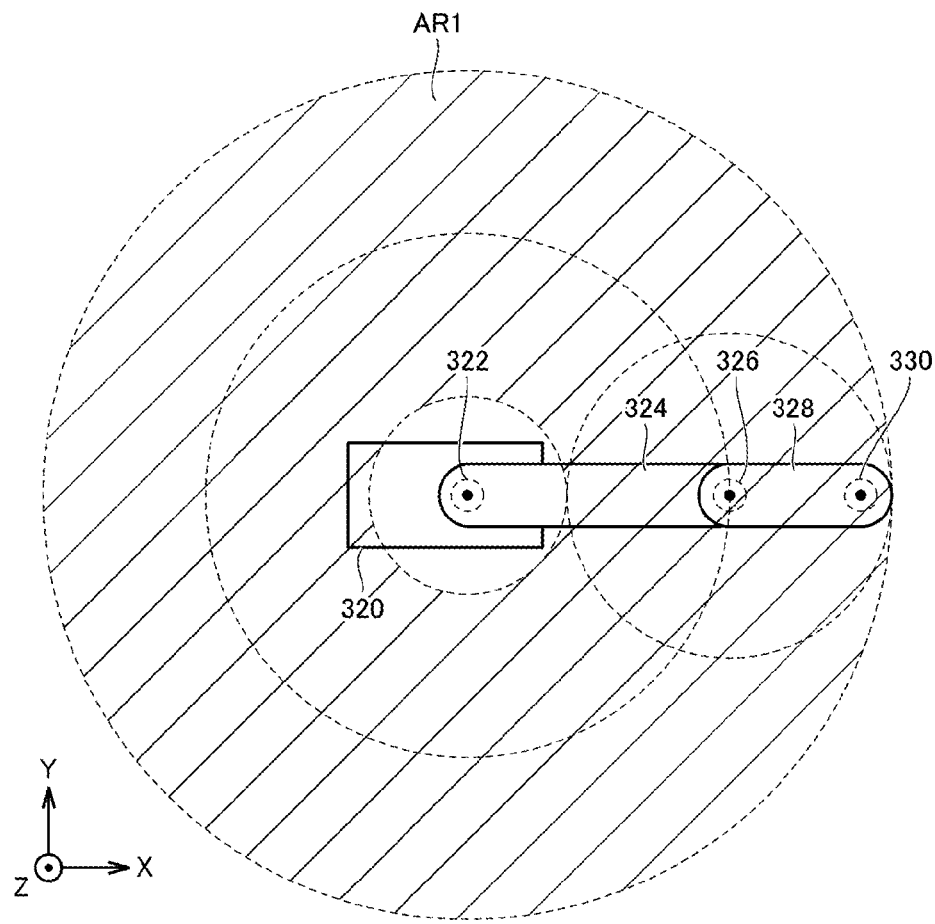
FIG. 3 is a plan view of the scara robot according to the first embodiment.

The scara robot 300 will be described with reference to FIG. 2 and FIG. 3. FIG. 2 is a side view of the scara robot 300. FIG. 3 is a plan view of the scara robot 300.

The scara robot 300 includes a base 320, a first rotational shaft 322, a first arm 324, a second rotational shaft 326, a second arm 328, a main shaft 330, and an operation tool 332.

The base 320 and the first arm 324 are connected by the first rotational shaft 322. The first rotational shaft 322 is driven to rotate by the servomotor 340A (refer to FIG. 1). As a result, the first arm 324 is driven to rotate about the first rotational shaft 322.

The first arm 324 and the second arm 328 are connected by the second rotational shaft 326. More specifically, one end of the first arm 324 is connected to the base 320 through the first rotational shaft 322 and the other end of the first arm 324 is connected to the second arm 328 through the second rotational shaft 326. The second rotational shaft 326 is driven to rotate by the servomotor 340B (refer to FIG. 1). As a result, the second arm 328 is driven to rotate about the second rotational shaft 326. When the first min 324 and the second arm 328 are driven such that they rotate in conjunction, the second arm 328 can operate within an operation area AR1.

For convenience of description, hereinafter, a predetermined direction on the horizontal plane will be referred to as an X direction. In addition, a direction orthogonal to the X direction on the horizontal plane will be referred to as a Y direction. A direction orthogonal to the X direction and the Y direction will be referred to as a Z direction. That is, the Z direction corresponds to the vertical direction.

The main shaft 330 can be driven in a direction (that is, the Z direction) parallel to the second rotational shaft 326 by the servomotor 340C (refer to FIG. 1). In addition, the main shaft 330 functions as a third rotational shaft and is driven to rotate by the servomotor 340D (refer to FIG. 1). That is, the main shaft 330 can be driven in the Z direction and is rotatable about a central axis in the Z direction.

At the tip of the main shaft 330, the operation tool 332 configured to perform a predetermined operation on a workpiece W is provided. The workpiece W is a product or a semi-finished product. The operation tool 332 functions as an end effector for exerting an effect on the workpiece W. The operation tool 332 is detachable from the main shaft 330. That is, at the tip of the main shaft 330, an interface for connecting the operation tool 332 is provided.

The operation tool 332 is, for example, a pickup tool for the workpiece W. As an example, the pickup tool picks up the workpiece W by suctioning the workpiece W using a suction force. Alternatively, the pick up tool may pick up the workpiece W by gripping the workpiece W. As an operation example of the operation tool 332, the operation tool 332 performs an operation of attaching the workpiece W such as a screw to a product that is conveyed along a conveyor. Alternatively, the operation tool 332 may perform an operation of sequentially moving workpieces W that are conveyed along a first conveyor to a container that is conveyed along a second conveyor.

A cable 333 connects the second arm 328 to the operation tool 332. More specifically, a connector 328A is provided on a surface of the second arm 328, and a connector 332A is provided on a surface of the operation tool 332. One end of the cable 333 is electrically connected to the connector 328A, and the other end of the cable 333 is electrically connected to the connector 332A. A control signal and driving power are transmitted to the operation tool 332 through the cable 333.

[C. Operation Control of Scara Robot]

Figure 4A:
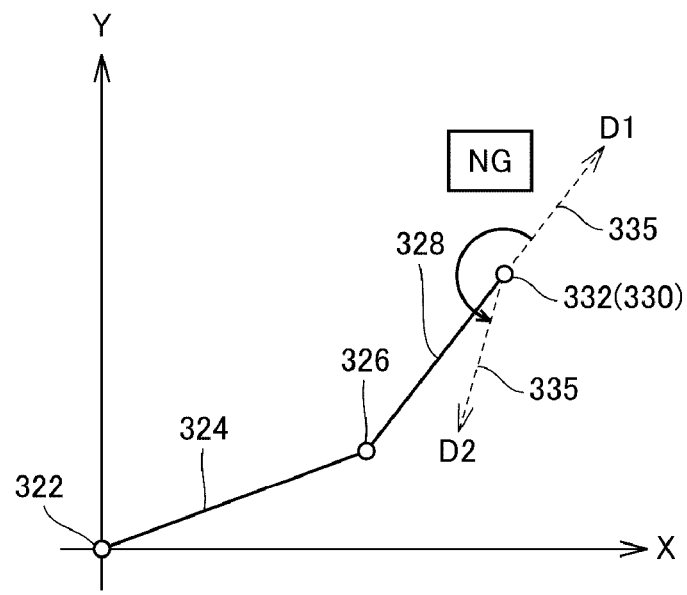
FIG. 4(A) and FIG. 4(B) show diagrams of the scara robot according to the first embodiment in a Z direction.
Figure 4B:
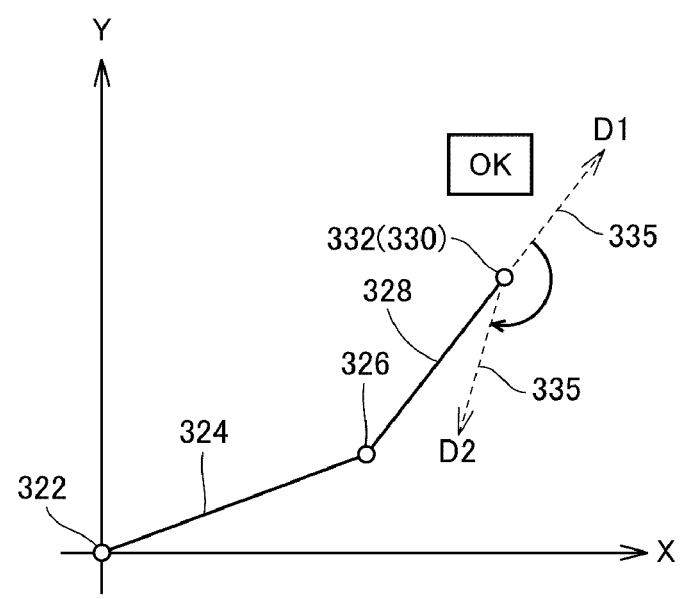

Operation control of the scara robot 300 will be described with reference to FIG. 4(A) and FIG. 4(B). FIG. 4(A) and FIG. 4(B) shows diagrams of the scara robot 300 in the Z direction. In FIG. 4(A) and FIG. 4(B), the first rotational shaft 322, the first arm 324, the second rotational shaft 326, the second arm 328, and the main shaft 330 are simplified and shown.

As described above, the cable 333 connects the second arm 328 to the operation tool 332. According to a rotational direction of the operation tool 332, the cable 333 may collide with a component (for example, the second arm 328 or the main shaft 330) of the scara robot 300. As a result, the cable 333 may rub against a component of the scara robot 300 or catch on a component and the cable 333 may be damaged. Therefore, the controller 200 according to the present embodiment decides a rotational direction of the operation tool 332 so that the cable 333 does not collide with a component of the scara robot 300 when the scara robot 300 is driven.

For convenience of description, hereinafter, counterclockwise rotation on an XY plane will be referred to as "forward rotation" and clockwise rotation on the XY plane will be referred to as "backward rotation." In addition, a predetermined direction fixed based on the operation tool 332 (or the main shaft 330) on the XY plane will be referred to as a "cable direction 335." The cable direction 335 is the same as or substantially the same as a direction on the XY plane on which the cable 333 is disposed with respect to the operation tool 332.

FIG. 4(A) shows a state in which the operation tool 332 rotates forward from a direction D1 to a direction D2. In the relation between a rotation angle of the second arm 328 and a rotation angle of the operation tool 332 shown in FIG. 4(A), when the operation tool 332 rotates forward, the cable direction 335 straddles the second min 328. As a result, the cable 333 comes in contact with the second arm 328.

FIG. 4(B) shows a state in which the operation tool 332 rotates backward from the direction D1 to the direction D2. In the relation between a rotation angle of the second arm 328 and a rotation angle of the operation tool 332 shown in FIG. 4(B), when the operation tool 332 rotates backward from the direction D1 to the direction D2, the cable direction 335 does not straddle the second arm 328. That is, the cable 333 does not come in contact with the second arm 328.

In this manner, a direction in which the operation tool 332 is rotated is decided according to the positional relation between the second arm 328 and the operation tool 332 before and after the operation tool 332 is moved. Focusing on this point, the controller 200 decides a rotational direction of the operation tool 332 so that the cable 333 does not come in contact with a component of the scara robot 300 when a control object of the scara robot 300 moves from a current position to a target position. The control object here is any driving component constituting the scara robot 300. As an example, the control object may be the first arm 324, the second arm 328, the main shaft 330, or the operation tool 332.

When a rotational direction of the operation tool 332 is decided so that the cable direction 335 does not straddle the second arm 328, the cable 333 is prevented from coming in contact with a component of the scara robot 300. As a result, the cable 333 is prevented from rubbing against a nearby component or catching on a nearby component, and damage to the cable 333 is prevented.

[D. Method of Deciding Rotational Direction]

A method of deciding a rotational direction of the operation tool 332 will be described with reference to FIG. 5 to FIG. 10. FIG. 5 to FIG. 10 are diagrams showing an example of the positional relation between the second arm 328 and the operation tool 332.

As described above, the controller 200 of the scara robot 300 decides a direction in which the operation tool 332 is rotated according to the positional relation between the second arm 328 and the operation tool 332.

Hereinafter, for convenience of description, a rotation angle of the second arm 328 before movement to a target position starts will be represented as a "rotation angle $\theta_{A1}$." A rotation angle of the operation tool 332 before movement to a target position starts will be represented as a "rotation angle $\theta_{B1}$." A rotation angle of the operation tool 332 after movement to a target position will be represented as a "rotation angle $\theta_{B2}$." The rotation angle $\theta_{A1}$, the rotation angle $\theta_{B1}$, and the rotation angle $\theta_{B2}$ will be represented as an angle on the XY plane. Here, while the rotation angles $\theta_{B1}$ and $\theta_{B2}$ are represented as a rotation angle of the operation tool 332, since the operation tool 332 is connected to the main shaft 330, the rotation angles $\theta_{B1}$ and $\theta_{B2}$ may be represented as a rotation angle of the main shaft 330.

The rotation angle $\theta_{A1}$ corresponds to an angle on the forward rotation side between a direction from one end on the main shaft 330 side of the second arm 328 to the other end on the second rotational shaft 326 side of the second arm 328 and a predetermined reference axis (for example, the X axis). More specifically, the controller 200 acquires a current position of the second arm 328 from the servo driver 400B (refer to FIG. 1) configured to drive the second arm 328 and calculates the rotation angle $\theta_{A1}$ from the current position.

The rotation angles $\theta_{B1}$ and $\theta_{B2}$ correspond to an angle on the forward rotation side between the predetermined reference axis (for example, the X axis) and the cable direction 335 (refer to FIG. 4(A) and FIG. 4(B)). For example, the rotation angle $\theta_{B1}$ before movement is calculated on the basis of an output result of the servo driver 400B (refer to FIG. 1) configured to rotate and drive the main shaft 330. The rotation angle $\theta_{B2}$ after movement is calculated on the basis of the target position which is a movement destination of the second arm 328.

The controller 200 decides a rotational direction of the operation tool 332 on the basis of relative relations between the rotation angle $\theta_{A1}$ of the second arm 328 before movement, the rotation angle $\theta_{B1}$ of the operation tool 332 before movement, and the rotation angle $\theta_{B2}$ of the operation tool 332 after movement.

Figure 5:
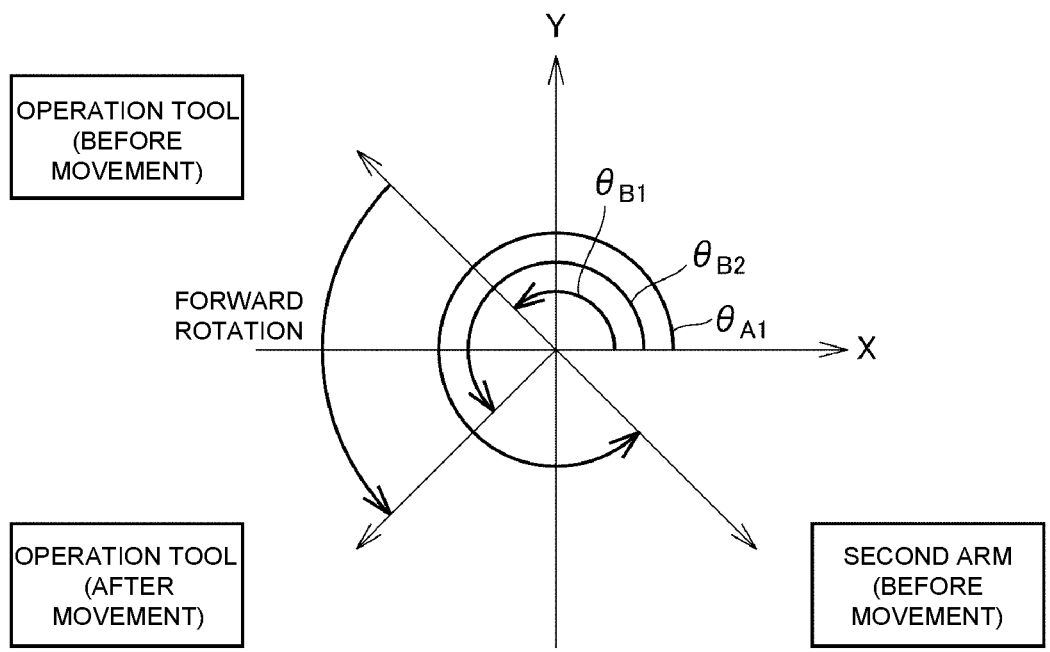
FIG. 5 is a diagram showing an example of a positional relation between a second arm and an operation tool.

More specifically, as shown in FIG. 5, when angular relations between the rotation angles $\theta_{A1}$, $\theta_{B1}$, and $\theta_{B2}$ satisfy the following Formula (1), the controller 200 decides that the operation tool 332 should rotate forward.

$$\theta_{B1} < \theta_{B2} < \theta_{A1} \quad (1)$$

Figure 6:
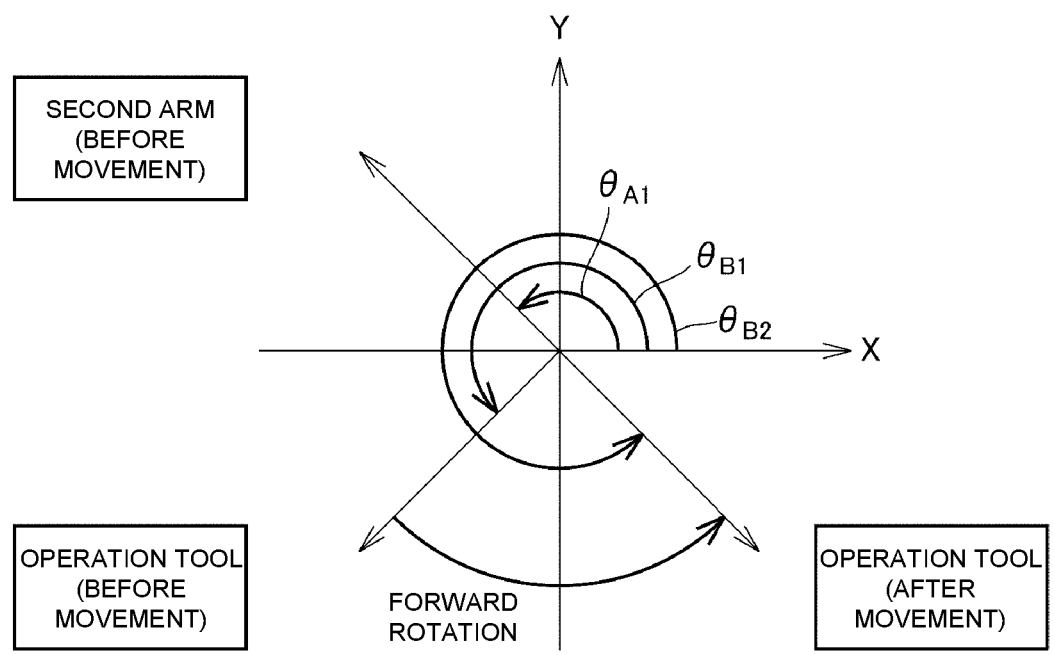
FIG. 6 is a diagram showing an example of a positional relation between the second arm and the operation tool.

As shown in FIG. 6, when the angular relations between the rotation angles $\theta_{A1}$, $\theta_{B1}$, and $\theta_{B2}$ satisfy the following Formula (2), the controller 200 decides that the operation tool 332 should rotate forward.

$$\theta_{A1} < \theta_{B1} < \theta_{B1} \quad (2)$$

Figure 7:
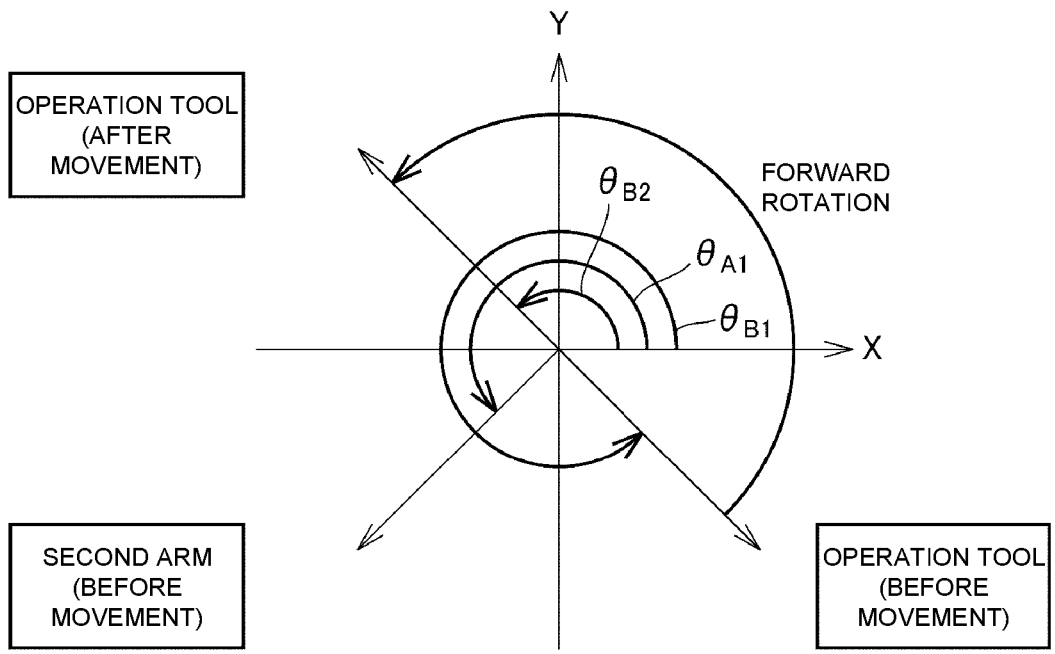
FIG. 7 is a diagram showing an example of a positional relation between the second arm and the operation tool.

As shown in FIG. 7, when the angular relations between the rotation angles $\theta_{A1}$, $\theta_{B1}$, and $\theta_{B2}$ satisfy the following Formula (3), the controller 200 decides that the operation tool 332 should rotate forward.

$$\theta_{B2} < \theta_{A1} < \theta_{B1} \quad (3)$$

Figure 8:
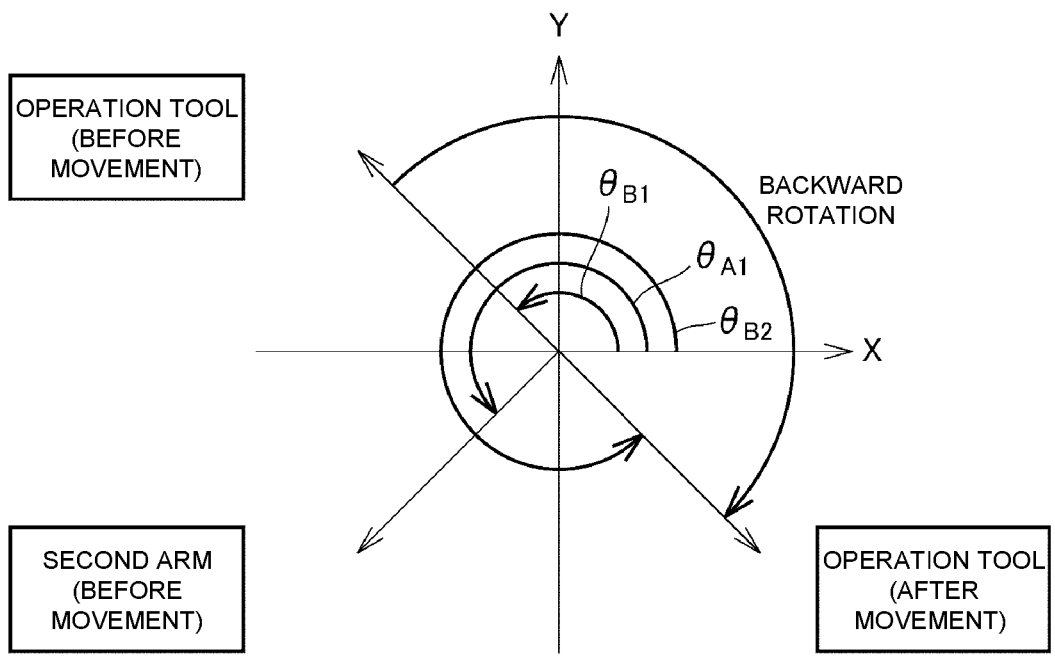
FIG. 8 is a diagram showing an example of a positional relation between the second arm and the operation tool.

As shown in FIG. 8, when the angular relations between the rotation angles $\theta_{A1}$, $\theta_{B1}$, and $\theta_{B2}$ satisfy the following Formula (4), the controller 200 decides that the operation tool 332 should rotate backward.

$$\theta_{B1} < \theta_{A1} < \theta_{B2} \quad (4)$$

Figure 9:
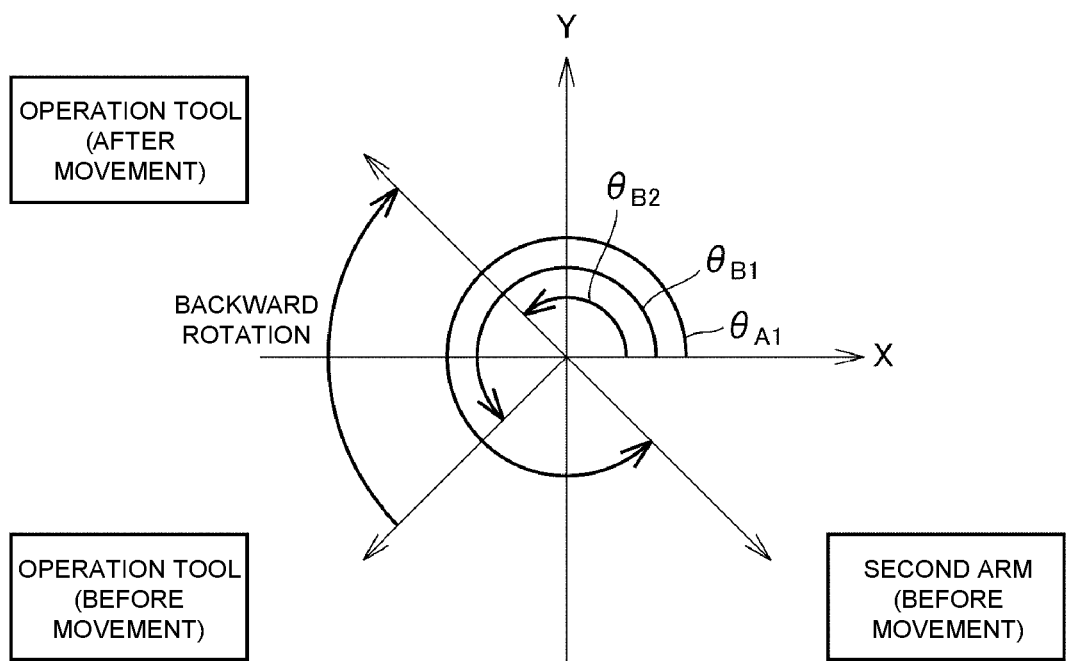
FIG. 9 is a diagram showing an example of a positional relation between the second arm and the operation tool.

As shown in FIG. 9, when the angular relations between the rotation angles $\theta_{A1}$, $\theta_{B1}$, and $\theta_{B2}$ satisfy the following Formula (5), the controller 200 decides that the operation tool 332 should rotate backward.

$$\theta_{B2} < \theta_{B1} < \theta_{A1} \quad (5)$$

Figure 10:
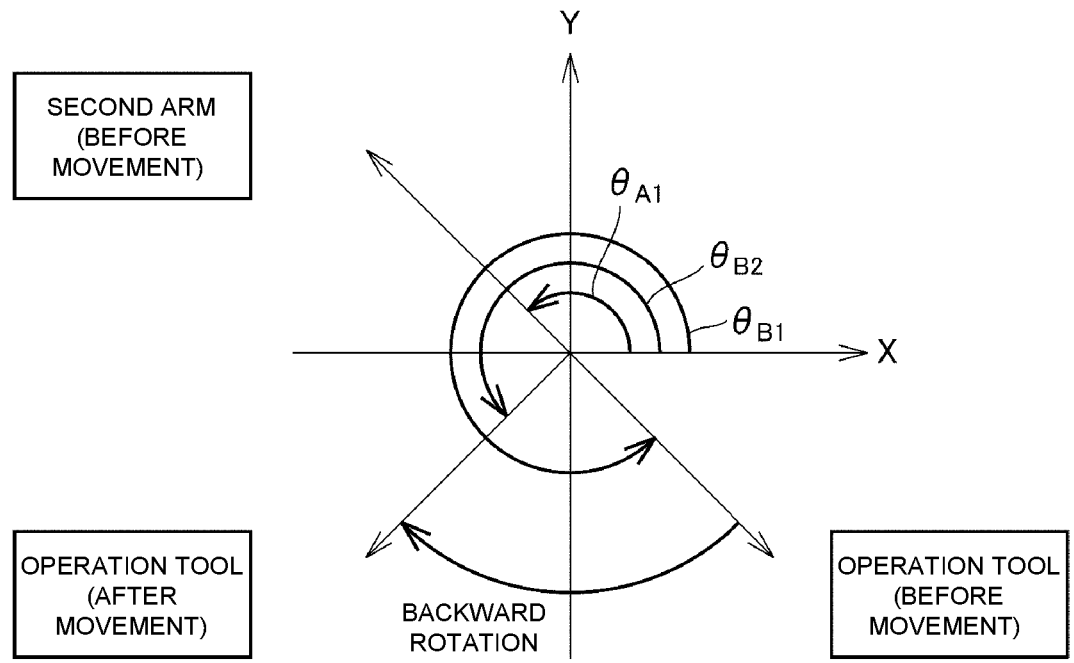
FIG. 10 is a diagram showing an example of a positional relation between the second arm and the operation tool.

As shown in FIG. 10, when the angular relations between the rotation angles $\theta_{A1}$, $\theta_{B1}$, and $\theta_{B2}$ satisfy the following Formula (6), the controller 200 decides that the operation tool 332 should rotate backward.

$$\theta_{A1} < \theta_{B2} < \theta_{B1} \quad (6)$$

Here, in the above description, it is assumed that a right-handed coordinate system in which the forward rotation direction is represented as a positive angle is used as a coordinate system of the scara robot 300, but the coordinate system of the scara robot 300 may be a left-handed coordinate system in which the backward rotation direction is represented as a positive angle. In this case, the magnitude relations shown in the above Formula (1) to Formula (6) are reversed. Typically, the above-described control for deciding a rotational direction may be applied to the scara robot 300 using either the right-handed or left-handed coordinate system. However, the control may be applied to the scara robot 300 using a coordinate system other than the right-handed and left-handed coordinate systems.

[E. Functional Configuration of Control System 1]

Figure 11:
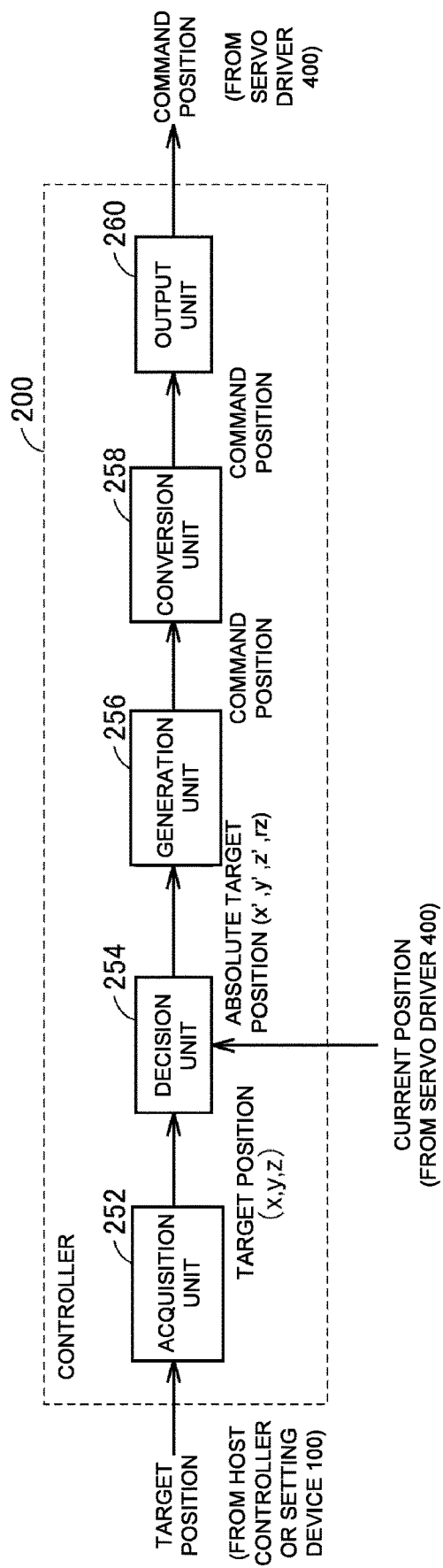
FIG. 11 is a diagram showing an example of a functional configuration of a controller constituting the control system according to the first embodiment.
Figure 12:
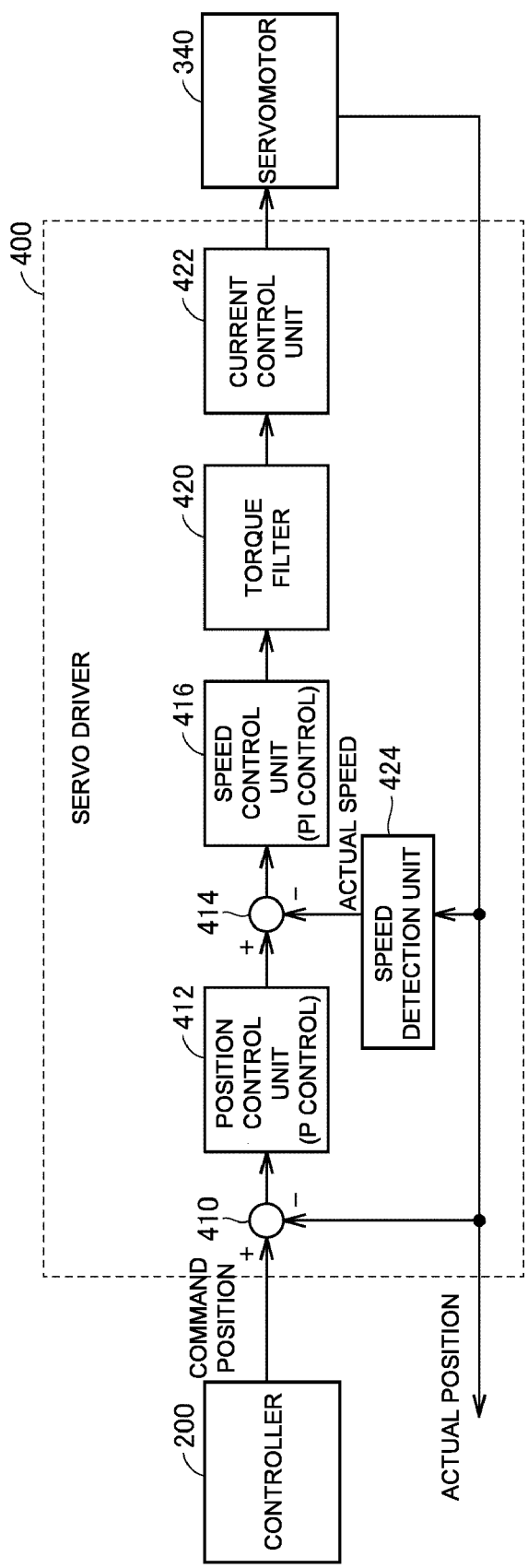
FIG. 12 is a diagram showing an example of a functional configuration of a servo driver constituting the control system according to the first embodiment.

Functions of devices constituting the control system 1 will be described with reference to FIG. 11 and FIG. 12. FIG. 11 is a diagram showing an example of a functional configuration of the controller 200 constituting the control system 1. FIG. 12 is a diagram showing an example of a functional configuration of the servo driver 400 constituting the control system 1.

(E1. Functional Configuration of Controller 200)

First, functions of the controller 200 will be described with reference to FIG. 11.

As shown in FIG. 11, the controller 200 includes an acquisition unit 252, a decision unit 254, a generation unit 256, a conversion unit 258, and an output unit 260 as functional configurations. Functional blocks shown in FIG. 11 are realized by, for example, a control device 201 (refer to FIG. 15) of the controller 200, which will be described below.

The acquisition unit 252 acquires a target position of the control object in the scara robot 300 from a host controller of the controller 200, the setting device 100, or the like. For example, the target position is decided by the host controller according to a preset operation procedure or designated by a user using a program tool installed in the setting device 100. For example, the target position is represented in a coordinate system (x, y, z) on the program tool. The target position acquired by the acquisition unit 252 is output to the decision unit 254.

The decision unit 254 decides a rotational direction of the operation tool 332 on the basis of the target position of the control object acquired by the acquisition unit 252 and the current position of the control object acquired from the servo driver 400. In addition, the decision unit 254 generates an absolute target position necessary for the generation unit 256 to generate a trajectory of the control object on the basis of the target position of the control object acquired by the acquisition unit 252 and the current position acquired from the servo driver 400. For example, the absolute target position is represented in a real space coordinate system (x', y', z', rz'). The coordinate value "x'" represents a position on the above-described X axis. The coordinate value "y'" represents a position on the above-described Y axis. The coordinate value "z'" represents a position on the above-described Z axis. The coordinate value "rz'" represents a rotational direction of the operation tool 332 and represents a forward rotation or a backward rotation. Processes performed by the decision unit 254 will be described below in detail.

Preferably, the decision unit 254 decides a rotational direction of the operation tool 332 before movement of the control object of the scara robot 300 starts. After the rotational direction is decided by the decision unit 254, the controller 200 rotates the operation tool 332 in the decided rotational direction when the control object (for example, the second arm 328 or the operation tool 332) of the scara robot 300 moves to the target position. That is, after the rotational direction of the operation tool 332 is decided, the controller 200 starts rotation and driving of the operation tool 332 in the decided rotational direction.

The generation unit 256 generates a speed waveform for moving the control object to the absolute target position output from the decision unit 254. The generation unit 256 outputs a command position for each predetermined period calculated on the basis of the generated speed waveform to the conversion unit 258.

The conversion unit 258 converts the command position output from the generation unit 256 into a format that can be read by the servo driver 400 of the scara robot 300. The conversion is performed on the basis of inverse kinematics computation or a predetermined coordinate system conversion formula. Therefore, the command position output from the generation unit 256 is converted into a robot coordinate system based on the scara robot 300.

The output unit 260 outputs the command position output from the conversion unit 258 to the servo driver 400. Therefore, each of the servo drivers 400 drives a corresponding control object toward the target position.

(E2. Functional Configuration of Servo Driver 400)

Next, an example of a functional configuration of the servo driver 400 connected to the controller 200 according to the present embodiment will be described with reference to FIG. 12. Functional blocks shown in FIG. 12 are realized by a control device (not shown) of the servo driver 400.

In the control system 1 according to the present embodiment, a target position is provided as a command value from the controller 200 to the servo driver 400. The servo driver 400 controls a drive current supplied to the servomotor 340 so that an actual position of each arm of the scara robot 300 serving as a control object coincides with the target position from the controller 200.

Typically, in the servo driver 400, a control loop including a minor loop regarding a speed in addition to a main loop regarding a position is provided. More specifically, the servo driver 400 includes difference computation units 410 and 414, a position control unit 412, a speed control unit 416, a torque filter 420, a current control unit 422, and a speed detection unit 424 as functional configurations.

The position control unit 412 is a control computation unit implementing a control loop regarding a position and outputs a control amount according to a deviation between the target position and the actual position (feedback value) calculated in the difference computation unit 410. In the position control unit 412, typically, proportion (P) control may be used. That is, the position control unit 412 outputs a value obtained by multiplying a deviation between the target position and the actual position by a predetermined proportional coefficient as a control amount.

The speed control unit 416 is a control computation unit implementing a control loop regarding a speed and outputs a control amount according to a deviation between the control amount from the position control unit 412 and an actual speed from the speed detection unit 424 calculated in the difference computation unit 414. In the speed control unit 416, typically, proportional integral (PI) control may be used. That is, the position control unit 412 outputs the sum of a value obtained by multiplying a deviation between a command speed from the position control unit 412 and an actual speed by a proportional coefficient and a value obtained by integrating the deviation with an integral element as a control amount.

The torque filter 420 reduces a degree of change over time so that a degree of change per unit time of the control amount (a command value of a torque to be generated in the servomotor 340) output from the speed control unit 416 does not become too large. That is, the torque filter 420 reduces the control amount output from the speed control unit 416. The control amount from the torque filter 420 is output to the current control unit 422.

The current control unit 422 decides a switching timing of the servomotor 340 of the scara robot 300 according to the control amount from the torque filter 420. That is, the current control unit 422 decides a magnitude, a timing, and a waveform of a current supplied to the servomotor 340 so that a command torque decided in the torque filter 420 can be realized. The servomotor 340 is driven according to the control amount decided by the current control unit 422. The servomotor 340 is driven to rotate according to the current supplied from the servomotor 340.

As a feedback value indicating a displacement of each arm of the scara robot 300, the actual position is output from the encoder (not shown). The speed detection unit 424 differentiates the actual position from the encoder and calculates an actual speed.

[F. Control Structure of Controller 200]

Figure 13:
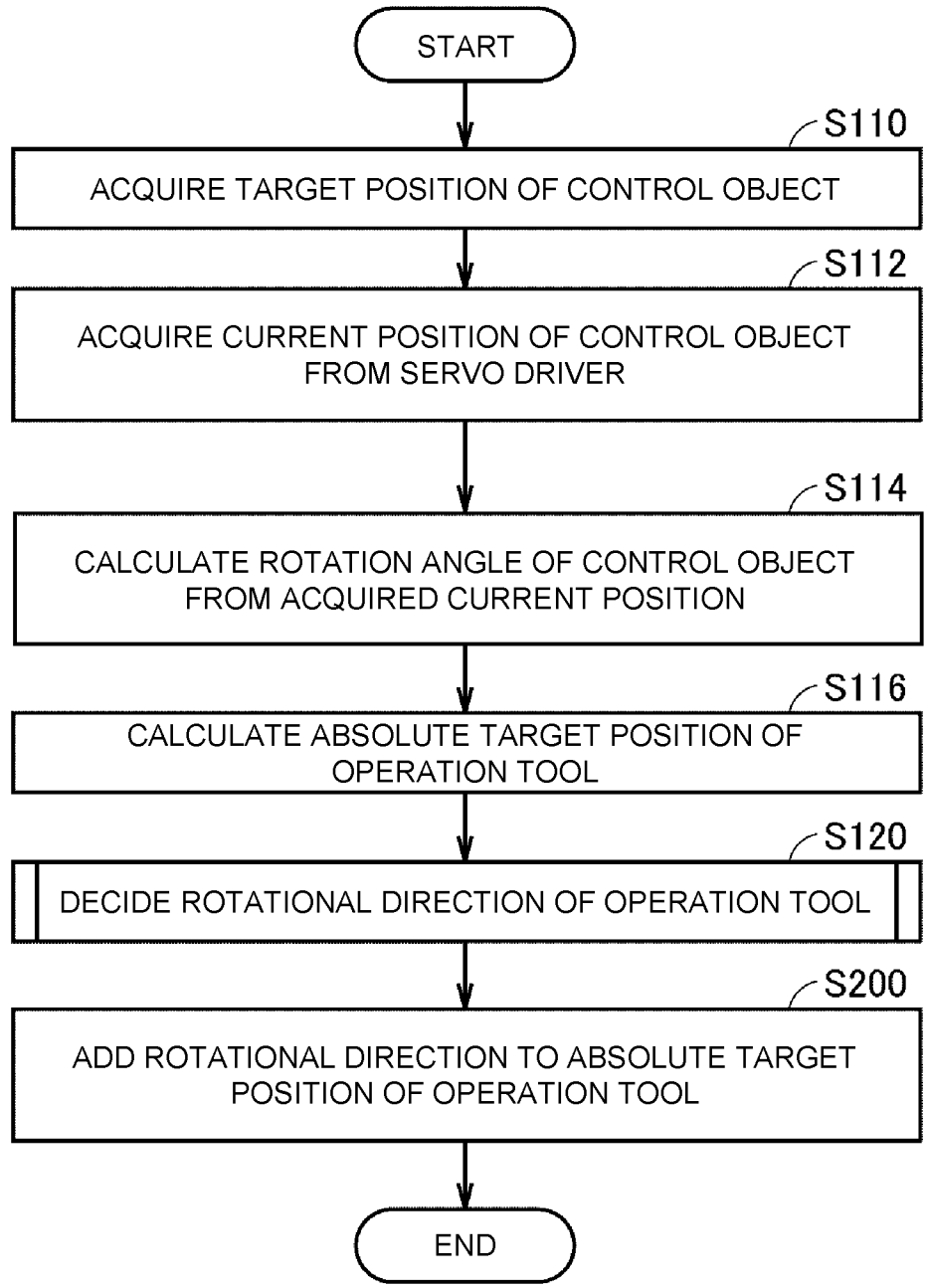
FIG. 13 is a flowchart of a process performed by a decision unit.

A control structure of the controller 200 will be described with reference to FIG. 13. FIG. 13 is a flowchart of a process performed by the above-described decision unit 254 (refer to FIG. 11). The process in FIG. 13 is realized by the control device 201 (refer to FIG. 15) of the controller 200, which will be described below. In another aspect, a part or all of the process may be performed by a circuit element or other hardware.

In Step S110, the control device 201, serving as the decision unit 254, receives a target position of the control object of the scara robot 300 from the above-described acquisition unit 252 (refer to FIG. 11). As an example, the control device 201 acquires a target position of the second arm 328 and a target position of the main shaft 330 (or the operation tool 332). For example, the target position is decided by a host controller according to a preset operation procedure and designated by a user using a program tool installed in the above-described setting device 100. For example, the target position is represented in a coordinate system (x, y, z) on the program tool.

In Step S112, the control device 201 acquires a current position of the control object from the servo driver 400. As an example, the control device 201 acquires a current position of the second arm 328 and a current position of the main shaft 330 (or the operation tool 332).

In Step S114, the control device 201 calculates a current rotation angle of the second arm 328 from the current position of the second arm 328 acquired in Step S112. As an example, the control device 201 converts the current position of the second arm 328 into a current rotation angle of the second arm 328 according to a predetermined matrix transformation formula.

In Step S116, the control device 201 converts the target position of the operation tool 332 acquired in Step S110 in a real space coordinate system (x', y', z'). The coordinate value "x'" represents a position on the above-described X axis. The coordinate value "y'" represents a position on the above-described Y axis. The coordinate value "z'" represents a position on the above-described Z axis. As an example, the control device 201 converts the target position of the operation tool 332 into a rotation angle of the second arm 328 after movement according to a predetermined matrix transformation formula.

In Step S120, the control device 201 decides a rotational direction of the operation tool 332. A flow of deciding a rotational direction of the operation tool 332 will be described with reference to FIG. 14.

In Step S200, the control device 201 adds the rotational direction decided in Step S120 to an absolute target position of the operation tool 332 calculated in Step S116. As a result, the absolute target position of the operation tool 332 on the real space is represented in a coordinate system (x', y', z', rz'). The coordinate value "rz'" represents a rotational direction of the operation tool 332 and represents forward rotation or backward rotation. Alternatively, the coordinate value "rz'" may be represented by a rotation angle of the operation tool 332. The absolute target position of the operation tool 332 on the real space is output to the above-described generation unit 256 (refer to FIG. 11).

(F1. Processing Flow in Step S120)

Figure 14:
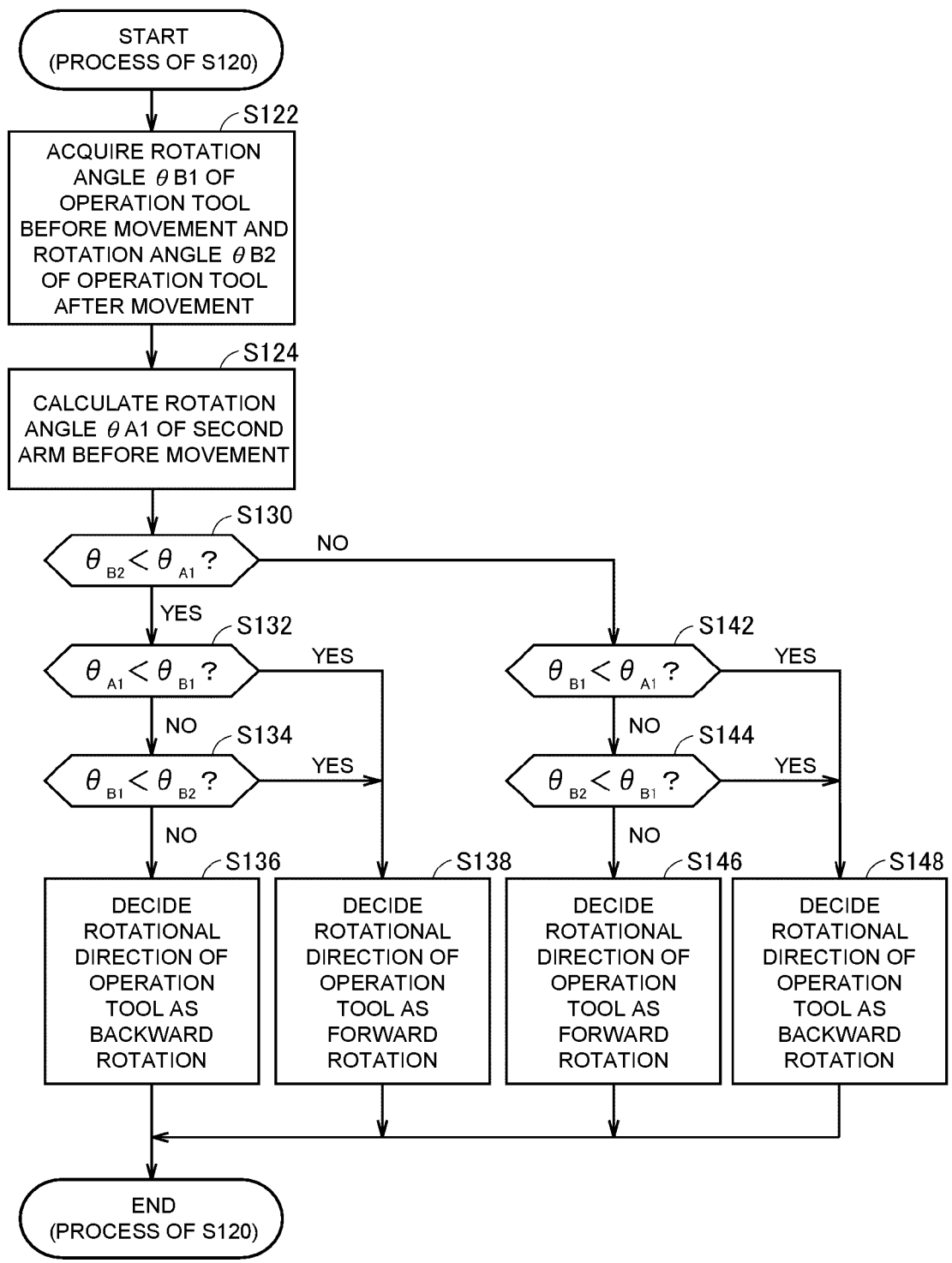
FIG. 14 is a diagram showing a processing flow of deciding a rotational direction of the operation tool in the first embodiment.

The process of Step S120 shown in FIG. 13 will be described in further detail with reference to FIG. 14. FIG. 14 is a diagram showing a processing flow of deciding a rotational direction of the operation tool 332.

In Step S122, the control device 201 acquires the rotation angle $\theta_{B1}$ (refer to FIG. 5 to FIG. 10) of the operation tool 332 before movement and the rotation angle $\theta_{B2}$ (refer to FIG. 5 to FIG. 10) of the operation tool 332 after movement. As described above, the rotation angles $\theta_{B1}$ and $\theta_{B2}$ correspond to an angle on the forward rotation side between the predetermined reference axis (for example, the X axis) and the above-described cable direction 335 (refer to FIG. 4(A) and FIG. 4(B)).

In Step S124, the control device 201 calculates the rotation angle $\theta_{A1}$ (refer to FIG. 5 to FIG. 10) of the second arm 328. Typically, the control device 201 decides a result obtained by adding 180 degrees to the rotation angle obtained from the servo driver 400B configured to drive the second arm 328 as the rotation angle $\theta_{A1}$. That is, generally, since the rotation angle of the second arm 328 output from the servo driver 400B represents a direction from one end of the second rotational shaft 326 of the second arm 328 to the other end of the main shaft 330 of the second arm 328, it represents a direction opposite to an arm direction. Therefore, the control device 201 specifies the arm direction by adding 180 degrees to the rotation angle of the second arm 328 output from the servo driver 400B.

In Step S130, the control device 201 determines whether the rotation angle $\theta_{B2}$ of the operation tool 332 after movement is smaller than the rotation angle $\theta_{A1}$ of the second arm 328 before movement. When it is determined that the rotation angle $\theta_{B2}$ is smaller than the rotation angle $\theta_{A1}$ (YES in Step S130), the control device 201 switches control to Step S132. Otherwise (NO in Step S130), the control device 201 switches control to Step S142.

In Step S132, the control device 201 determines whether the rotation angle $\theta_{A1}$ of the second arm 328 before movement is smaller than the rotation angle $\theta_{B1}$ of the operation tool 332 before movement. When it is determined that the rotation angle $\theta_{A1}$ is smaller than the rotation angle $\theta_{B1}$ (YES in Step S132), the control device 201 switches control to Step S138. Otherwise (NO in Step S132), the control device 201 switches control to Step S134.

In Step S134, the control device 201 determines whether the rotation angle $\theta_{B1}$ of the operation tool 332 before movement is smaller than the rotation angle $\theta_{B2}$ of the operation tool 332 after movement. When it is determined that the rotation angle $\theta_{B1}$ is smaller than the rotation angle $\theta_{B2}$ (YES in Step S134), the control device 201 switches control to Step S138. Otherwise (NO in Step S134), the control device 201 switches control to Step S136.

In Step S136, the control device 201 decides the rotational direction of the operation tool 332 as backward rotation.

In Step S138, the control device 201 decides the rotational direction of the operation tool 332 as forward rotation.

In Step S142, the control device 201 determines whether the rotation angle $\theta_{B1}$ of the operation tool 332 before movement is smaller than the rotation angle $\theta_{A1}$ of the second arm 328 before movement. When it is determined that the rotation angle $\theta_{B1}$ is smaller than the rotation angle $\theta_{A1}$ (YES in Step S142), the control device 201 switches control to Step S148. Otherwise (NO in Step S142), the control device 201 switches control to Step S144.

In Step S144, the control device 201 determines whether the rotation angle $\theta_{B2}$ of the operation tool 332 after movement is smaller than the rotation angle $\theta_{B1}$ of the operation tool 332 before movement. When it is determined that the rotation angle $\theta_{B2}$ is smaller than the rotation angle $\theta_{B1}$ (YES in Step S144), the control device 201 switches control to Step S148. Otherwise (NO in Step S144), the control device 201 switches control to Step S146.

In Step S146, the control device 201 decides the rotational direction of the operation tool 332 as forward rotation.

In Step S148, the control device 201 decides the rotational direction of the operation tool 332 as backward rotation.

[G. Hardware Configuration of Controller 200]

Figure 15:
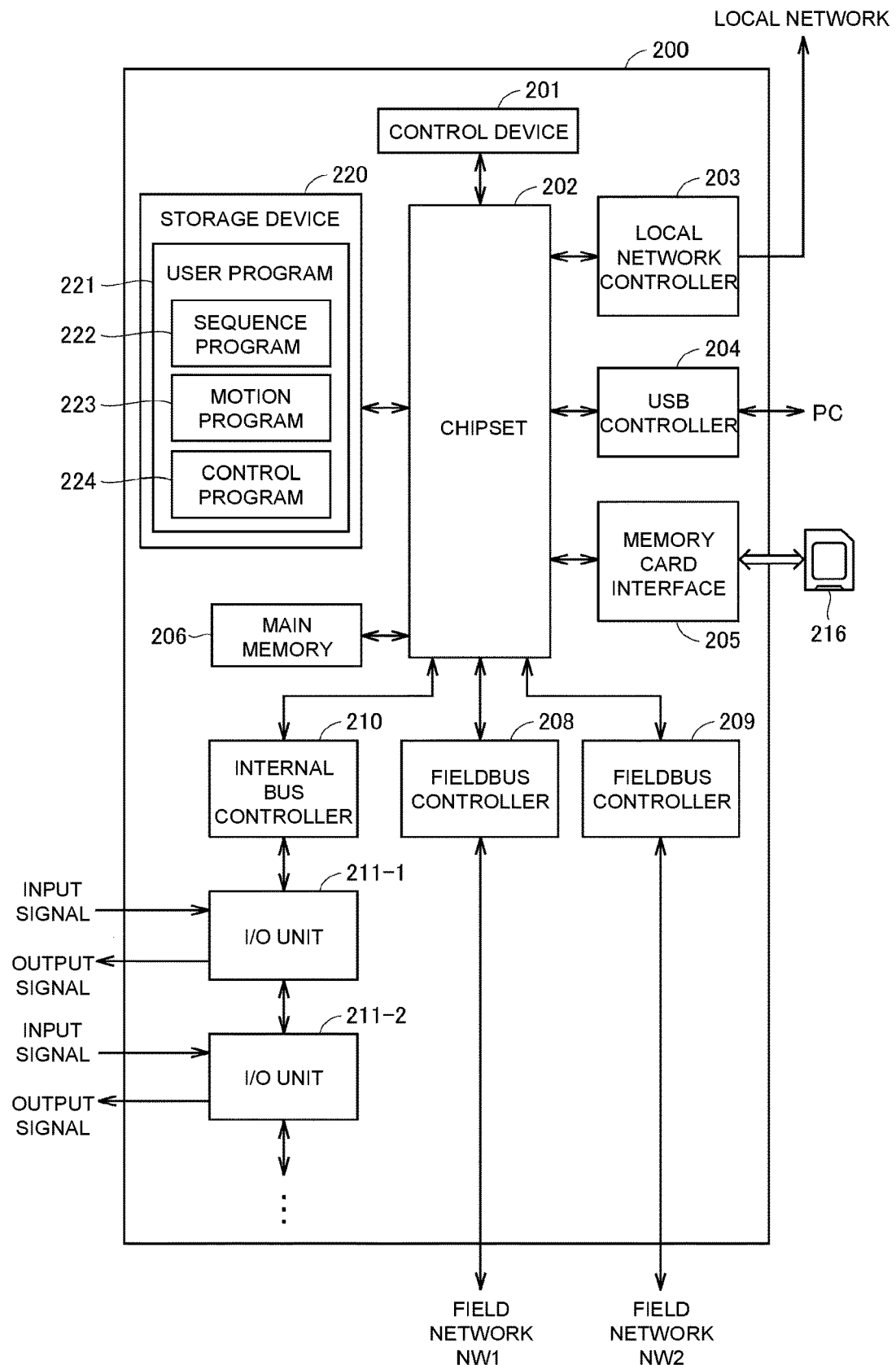
FIG. 15 is a block diagram showing a hardware configuration example of the controller according to the first embodiment.

A hardware configuration of the controller 200 will be described with reference to FIG. 15. FIG. 15 is a block diagram showing a hardware configuration example of the controller 200.

The controller 200 includes the control device 201 such as a central processing unit (CPU) and a micro-processing unit (MPU), a chipset 202, a main memory 206, a storage device 220, a local network controller 203, a universal serial bus (USB) controller 204, a memory card interface 205, an internal bus controller 210, fieldbus controllers 208 and 209, and I/O units 211-1, 211-2 . . . .

The control device 201 reads various types of program stored in the storage device 220 and loads them into and executes them in the main memory 206, and realizes control according to the control object and a process according to the present embodiment. The chipset 202 controls the control device 201 and components so that the process of the controller 200 as a whole is realized.

The storage device 220 is, for example, a secondary storage device. In the storage device 220, a system program for realizing a PLC engine, a user program 221 that is executed using the PLC engine, and the like are stored. The user program 221 includes a sequence program 222 mainly for logical computation, a motion program 223 mainly for numerical computation such as position control or speed control, and a control program 224 of the scara robot 300.

The local network controller 203 controls data exchange with another device (for example, a server) via a local network. The USB controller 204 controls data exchange with another device (for example, a personal computer (PC)) through USB connection.

The memory card interface 205 is configured to allow attachment and detachment of a memory card 216 and can write data to the memory card 216 and read various types of data (such as a user program and trace data) from the memory card 216.

The internal bus controller 210 is an interface configured to exchange data with the I/O units 211-1, 211-2, . . . installed in the controller 200.

The fieldbus controller 208 controls data exchange with another device (for example, the setting device 100) via the field network NW1 (refer to FIG. 1). Similarly, the fieldbus controller 209 controls data exchange with another device (for example, the scara robot 300 or the servo driver 400) via the field network NW2 (refer to FIG. 1).

While FIG. 15 shows a configuration example in which functions necessary for the control device 201 to execute a program are provided, some or all of the provided functions may be provided using a dedicated hardware circuit (for example, an application specific integrated circuit (ASIC) or a field-programmable gate array (FPGA)). Alternatively, the main part of the controller 200 may be realized using hardware (for example, an industrial personal computer based on a general purpose personal computer) according to a general purpose architecture. In this case, a plurality of operating systems (OS) for different purposes are executed in parallel using a virtualization technology, and required applications may be executed on each OS.

[H. Summary of First Embodiment]

As described above, the controller 200 according to the present embodiment decides a rotational direction of the operation tool 332 so that the cable 333 does not collide with a component of the scara robot 300 (for example, the second arm 328 or the operation tool 332) when the control object of the scara robot 300 moves to the target position. Then, the controller 200 rotates the operation tool 332 in the decided rotational direction when the control object moves. Therefore, damage to the cable 333 during the operation is prevented. Since such damage is prevented according to control in the rotational direction of the operation tool 332, there is no need to newly provide a mechanical structure to the scara robot. Accordingly, an increase in the cost of the scara robot 300 is prevented and the size of the scara robot 300 does not increase.

Second Embodiment

[A. Overview]

Figure 16:
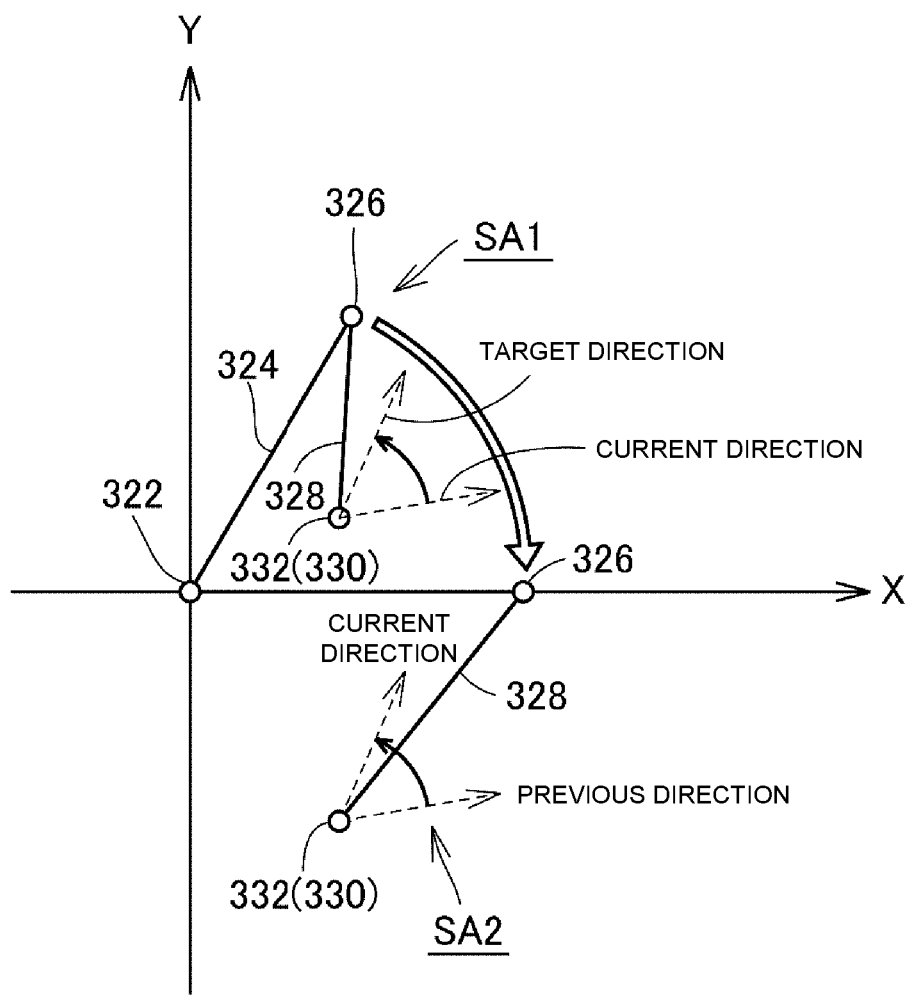
FIG. 16 is a diagram for explaining an overview of a controller according to a second embodiment.

FIG. 16 is a diagram for explaining an overview of the controller 200 according to a second embodiment.

FIG. 16 shows a state in which the scara robot 300 transitions from a state SA1 to a state SA2. The controller 200 according to the first embodiment decides a rotational direction of the operation tool 332 on the basis of relative relations between a rotation angle of the second arm 328 before movement, a rotation angle of the operation tool 332 before movement, and a rotation angle of the operation tool 332 after movement. When the method of deciding a rotational direction in the first embodiment is used, in the state SA1, the controller 200 decides that the operation tool 332 should rotate backward.

However, when the state SA1 transitions to the state SA2, a positional relation between the second arm 328 and the operation tool 332 changes. As a result, when the operation tool 332 rotates backward, the cable 333 collides with a component of the scara robot 300. In this manner, in the method of deciding a rotational direction described in the first embodiment, the cable 333 rarely collides with a component of the scara robot 300.

Therefore, the controller 200 according to the second embodiment decides a rotational direction of the operation tool 332 using not only a rotation angle of the second arm 328 before movement, a rotation angle of the operation tool 332 before movement, and a rotation angle of the operation tool 332 after movement but also a rotation angle of the second arm 328 after movement. In this manner, in consideration of the rotation angle of the second arm 328 after movement, the controller 200 can prevent the cable 333 from coming in contact with the second arm 328 during an operation more reliably.

Since the other parts of the hardware configuration of the control system 1 according to the second embodiment are the same as those of the control system 1 according to the first embodiment, descriptions thereof will not be repeated below.

[B. Control Structure of Controller 200]

Figure 17:
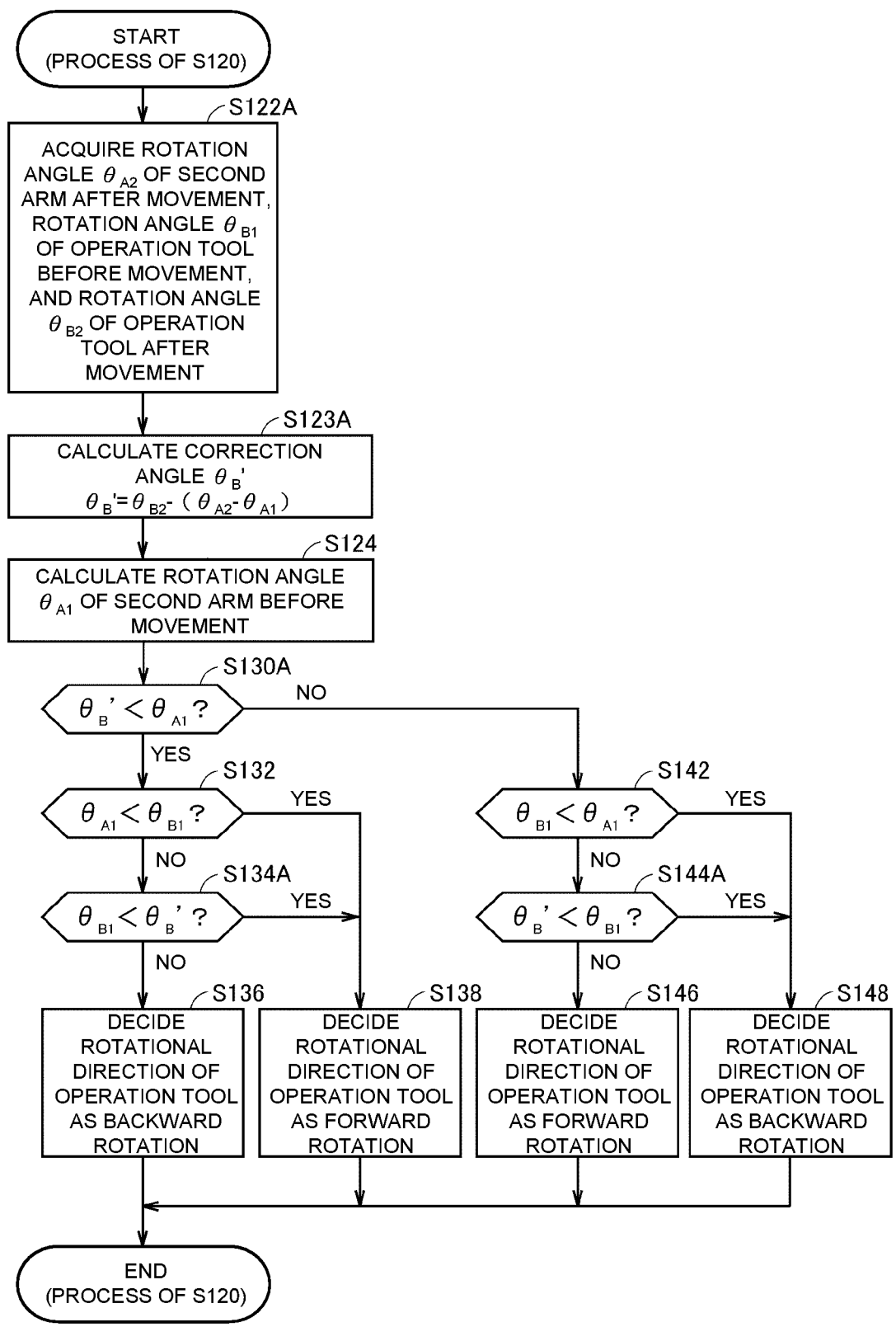
FIG. 17 is a diagram showing a processing flow of deciding a rotational direction of an operation tool in the second embodiment.

A control structure of the controller 200 according to the second embodiment will be described with reference to FIG. 17. FIG. 17 is a diagram showing a processing flow of deciding a rotational direction of the operation tool 332 in the second embodiment.

In Step S122A, the control device 201 acquires a rotation angle $\theta_{A2}$ of the second arm 328 after movement, a rotation angle $\theta_{B1}$ of the operation tool 332 before movement, and a rotation angle $\theta_{B2}$ of the operation tool 332 after movement. The rotation angle $\theta_{A2}$ corresponds to an angle on the forward rotation side between a direction from one end on the main shaft 330 side of the second arm 328 to the other end on the second rotational shaft 326 side of the second arm 328 and the predetermined reference axis (for example, the X axis). The rotation angle $\theta_{A2}$ after movement is calculated on the basis of the target position of the control object of the scara robot 300.

In Step S123A, the control device 201 calculates a correction angle $\theta_B'$ by subtracting a rotation angle (that is, $\theta_{A2}-\theta_{A1}$) of the second arm 328 between before movement and after movement from the rotation angle $\theta_{B2}$ of the second arm 328. That is, the correction angle $\theta_B'$ is calculated on the basis of the following Formula (7).

$$\theta_B'=\theta_{B2}-(\theta_{A2}-\theta_{B1}) \tag{7}$$

In Step S124, the control device 201 calculates the rotation angle $\theta_{A1}$ of the second arm 328 (refer to FIG. 5 to FIG. 10). Typically, the control device 201 decides a result obtained by adding 180 degrees to the rotation angle obtained from the servo driver 400B configured to drive the second arm 328 as the rotation angle $\theta_{A1}$. That is, generally, the rotation angle of the second arm 328 output from the servo driver 400B represents a direction from one end on the second rotational shaft 326 side of the second arm 328 to the other end on the main shaft 330 side of the second arm 328. However, the control device 201 adds 180 degrees to the angle and performs conversion to a direction from one end on the main shaft 330 side of the second arm 328 to the other end on the second rotational shaft 326 side of the second arm 328.

In Step S130A, the control device 201 determines whether the correction angle $\theta_B'$ calculated in Step S123A is smaller than the rotation angle $\theta_{A1}$ of the second arm 328 before movement. When it is determined that the correction angle $\theta_B'$ is smaller than the rotation angle $\theta_{A1}$ (YES in Step S130A), the control device 201 switches control to Step S132. Otherwise (NO in Step S130A), the control device 201 switches control to Step S142.

In Step S132, the control device 201 determines whether the rotation angle $\theta_{A1}$ of the second arm 328 before movement is smaller than the rotation angle $\theta_{B1}$ of the operation tool 332 before movement. When it is determined that the rotation angle $\theta_{A1}$ is smaller than the rotation angle $\theta_{B1}$ (YES in Step S132), the control device 201 switches control to Step S138. Otherwise (NO in Step S132), the control device 201 switches control to Step S134A.

In Step S134A, the control device 201 determines whether the rotation angle $\theta_{B1}$ of the operation tool 332 before movement is smaller than the correction angle $\theta_B'$ calculated in Step S123A. When it is determined that the rotation angle $\theta_{B1}$ is smaller than the correction angle $\theta_{13}'$ (YES in Step S134A), the control device 201 switches control to Step S138. Otherwise (NO in Step S134A), the control device 201 switches control to Step S136.

In Step S136, the control device 201 decides the rotational direction of the operation tool 332 as backward rotation.

In Step S138, the control device 201 decides the rotational direction of the operation tool 332 as forward rotation.

In Step S142, the control device 201 determines whether the rotation angle $\theta_{B1}$ of the operation tool 332 before movement is smaller than the rotation angle $\theta_{A1}$ of the second arm 328 before movement. When it is determined that the rotation angle $\theta_{B1}$ is smaller than the rotation angle $\theta_{A1}$ (YES in Step S142), the control device 201 switches control to Step S148. Otherwise (NO in Step S142), the control device 201 switches control to Step S144A.

In Step S144A, the control device 201 determines whether the correction angle $\theta_B'$ calculated in Step S123A is smaller than the rotation angle $\theta_{B1}$ of the operation tool 332 before movement. When it is determined that the correction angle $\theta_B'$ is smaller than the rotation angle $\theta_{B1}$ (YES in Step S144A), the control device 201 switches control to Step S148. Otherwise (NO in Step S144A), the control device 201 switches control to Step S146.

In Step S146, the control device 201 decides the rotational direction of the operation tool 332 as forward rotation.

In Step S148, the control device 201 decides the rotational direction of the operation tool 332 as backward rotation.

C. Summary of Second Embodiment

As described above, the controller 200 according to the present embodiment decides a rotational direction of the operation tool 332 on the basis of relative relations between a rotation angle of the second arm 328 before the control object moves, a rotation angle of the second arm 328 after the control object moves, a rotation angle of the operation tool 332 before the control object moves, and a rotation angle of the operation tool 332 after the control object moves. In this manner, with additional consideration of the rotation angle of the second arm 328 after movement, the controller 200 can prevent the cable 333 from colliding with a component of the scara robot 300 during an operation more reliably.

The embodiments disclosed here are only examples and should not be considered as restrictive. The scope of the invention is not limited by the above description, but it is defined by the scope of the appended claims, and includes equivalents to the scope of the claims and all modifications within the scope.

What is claimed is:
1. A control system, comprising:
a robot; and
a controller configured to control the robot,
wherein the robot comprises:
   a first rotational shaft;
   a first arm configured to be rotatable on a plane orthogonal to the first rotational shaft about the first rotational shaft;
   a second rotational shaft disposed parallel to the first rotational shaft and provided in the first arm;
   a second arm configured to be rotatable on a plane orthogonal to the second rotational shaft about the second rotational shaft;
   a main shaft disposed parallel to the second rotational shaft and provided in the second arm;
   an operation tool configured to be rotatable about the main shaft and provided at a tip of the main shaft, and configured to perform a predetermined operation on a workpiece; and
   a cable connecting the second arm to the operation tool, and
wherein the controller comprises:
   an acquisition unit configured to acquire a target position of a control object in the robot; and
   a decision unit configured to decide a rotational direction of the operation tool so that the cable does not collide with a component of the robot when the control object moves to the target position.

2. The control system according to claim 1,
wherein the decision unit decides the rotational direction on the basis of relative relations between a rotation angle of the second arm before the control object moves, a rotation angle of the operation tool before the control object moves, and a rotation angle of the operation tool after the control object moves.

3. The control system according to claim 2,
wherein the decision unit decides the rotational direction before movement of the control object starts.

4. The control system according to claim 2,
wherein the operation tool rotates in the rotational direction when the control object moves to the target position.

5. The control system according to claim 1,
wherein the decision unit decides the rotational direction on the basis of relative relations between a rotation angle of the second arm before the control object moves, a rotation angle of the second arm after the control object moves, a rotation angle of the operation tool before the control object moves, and a rotation angle of the operation tool after the control object moves.

6. The control system according to claim 5,
wherein the decision unit decides the rotational direction before movement of the control object starts.

7. The control system according to claim 5,
wherein the operation tool rotates in the rotational direction when the control object moves to the target position.

8. The control system according to claim 1,
wherein the decision unit decides the rotational direction before movement of the control object starts.

9. The control system according to claim 8,
wherein the operation tool rotates in the rotational direction when the control object moves to the target position.

10. The control system according to claim 1,
wherein the operation tool rotates in the rotational direction when the control object moves to the target position.

11. A controller of a robot,
wherein the robot comprises:
  a first rotational shaft;
  a first arm configured to be rotatable on a plane orthogonal to the first rotational shaft about the first rotational shaft;
  a second rotational shaft disposed parallel to the first rotational shaft and provided in the first arm;
  a second arm configured to be rotatable on a plane orthogonal to the second rotational shaft about the second rotational shaft;
  a main shaft disposed parallel to the second rotational shaft and provided in the second arm;
  an operation tool configured to be rotatable about the main shaft and provided at a tip of the main shaft, and performs a predetermined operation on a workpiece; and
  a cable connecting the second arm to the operation tool, and
wherein the controller comprises:
  an acquisition unit configured to acquire a target position of a control object in the robot; and
  a decision unit configured to decide a rotational direction of the operation tool so that the cable does not collide with a component of the robot when the control object moves to the target position.

12. A control method of a robot,
wherein the robot comprises:
  a first rotational shaft;
  a first arm which is rotatable on a plane orthogonal to the first rotational shaft about the first rotational shaft;
  a second rotational shaft disposed parallel to the first rotational shaft and provided in the first arm;
  a second arm configured to be rotatable on a plane orthogonal to the second rotational shaft about the second rotational shaft;
  a main shaft disposed parallel to the second rotational shaft and provided in the second arm;
  an operation tool configured to be rotatable about the main shaft and provided at a tip of the main shaft, and configured to perform a predetermined operation on a workpiece; and
  a cable connecting the second arm to the operation tool,
wherein the control method comprises:
  acquiring a target position of a control object in the robot; and
  deciding a rotational direction of the operation tool so that the cable does not collide with a component of the robot when the control object moves to the target position.

13. A non-transitory recording medium, storing control program of a robot,
wherein the robot comprises:
  a first rotational shaft;
  a first arm configured to be rotatable on a plane orthogonal to the first rotational shaft about the first rotational shaft;
  a second rotational shaft disposed parallel to the first rotational shaft and provided in the first arm;
  a second arm configured to be rotatable on a plane orthogonal to the second rotational shaft about the second rotational shaft;
  a main shaft disposed parallel to the second rotational shaft and provided in the second arm;
  an operation tool configured to be rotatable about the main shaft and provided at a tip of the main shaft, and configured to perform a predetermined operation on a workpiece; and
  a cable connecting the second arm to the operation tool, and
wherein the control program causes a controller of the robot to execute:
  acquiring a target position of a control object in the robot; and
  deciding a rotational direction of the operation tool so that the cable does not collide with a component of the robot when the control object moves to the target position.

* * * * *